G. W. MILLER.
PIPE CUTTER.
APPLICATION FILED JUNE 22, 1920.
1,392,192.
Patented Sept. 27, 1921.
2 SHEETS—SHEET 2.
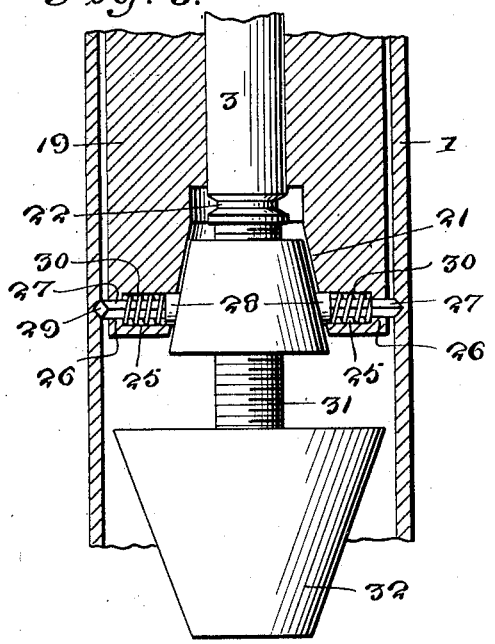
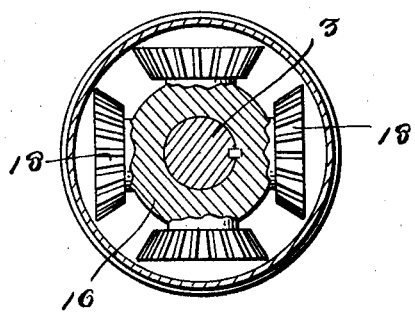
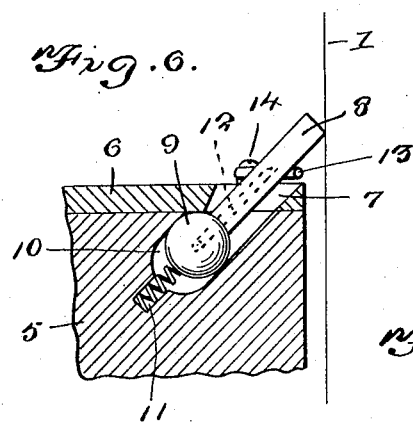
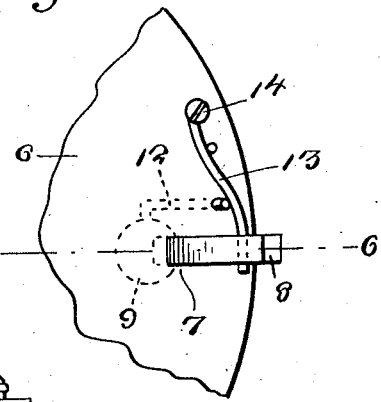
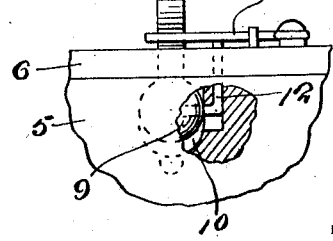
G. W. Miller
INVENTOR
BY Victor J. Evans
ATTORNEY
WITNESS:
E. R. Ruppert.

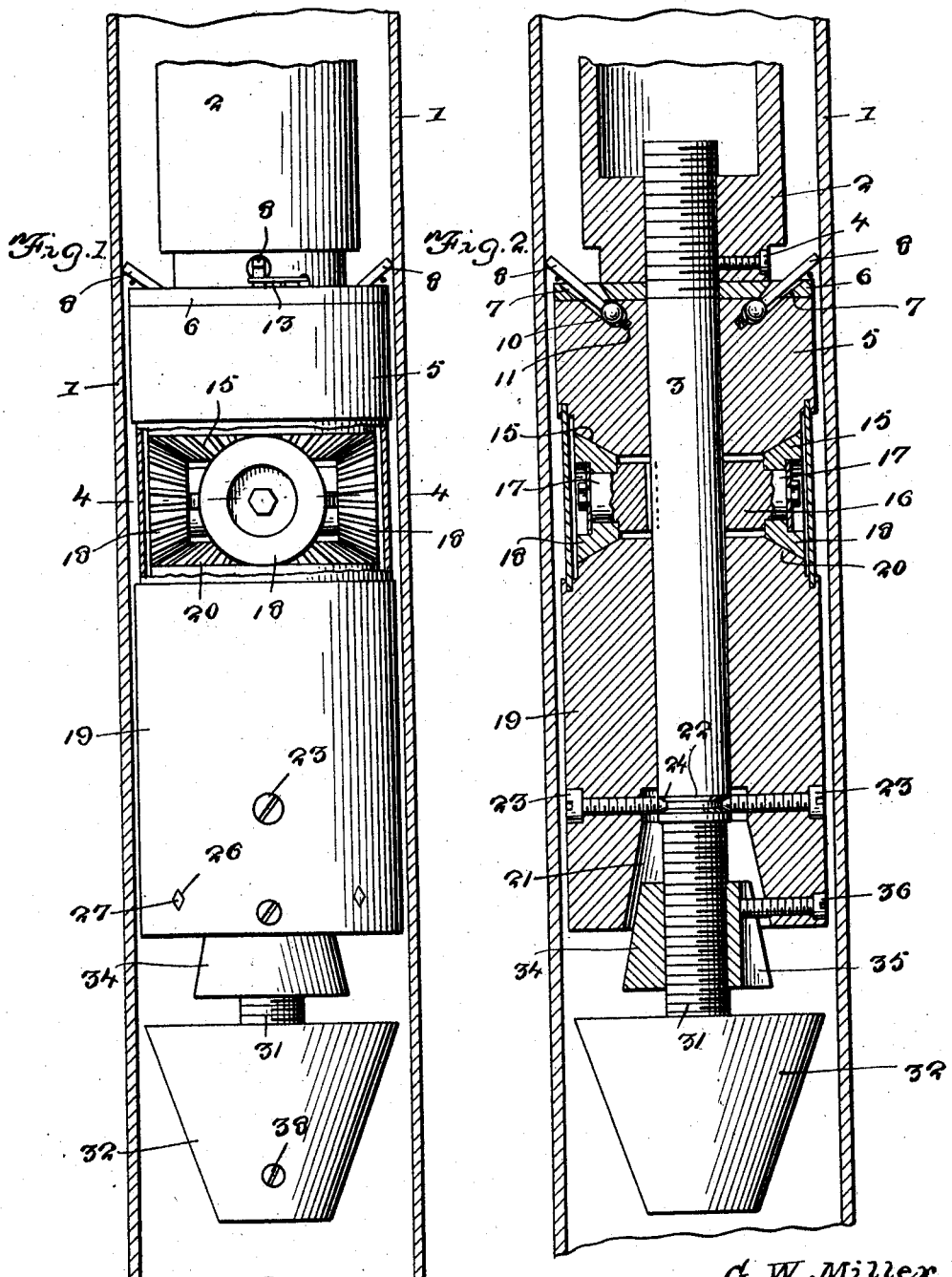

UNITED STATES PATENT OFFICE.

GEORGE W. MILLER, OF MANSFIELD, MISSOURI.

PIPE-CUTTER.

1,392,192.  Specification of Letters Patent.  Patented Sept. 27, 1921.

Application filed June 22, 1920. Serial No. 390,932.

*To all whom it may concern:*

Be it known that I, GEORGE W. MILLER, a citizen of the United States, residing at Mansfield, in the county of Wright and State of Missouri, have invented new and useful Improvements in Pipe-Cutters, of which the following is a specification.

My present invention has reference to a means for cutting well casings to facilitate the removal of twisted or damaged portions thereof from a well.

The object is the provision of simple means which may be sunk into the well casing at any desired depth, and which includes means for holding the same against rotary movement in the said casing and cutting means revoluble on the said first mentioned means, the actuating means for the cutting means also advancing the same in a cutting direction.

A further object is the production of means whereby sections of a well casing may be severed to facilitate the removal thereof, comprising a member having normally latched fingers which contact with the well casing and hold the said member against rotary movement thereon, said member having associated therewith revoluble means for laterally projecting cutting elements which sever the tool, means being provided for retracting the fingers out of casing engagement to permit of the removal of the device from the casing and the removal of the severed portion of the casing.

A still further object is to produce a device of this character having means for guiding the same through the well casing, laterally disposed cutters being above said guide, a projecting element for said cutters, revoluble means therefor, and means above said revoluble means engaging with the casing and to which the operating means are connected, whereby to hold the former against turning on the casing, while means is provided for bringing the latter out of casing engagement and retracting the cutter after the casing or tube has been severed to permit of the removal of the device from the casing and the removal of the severed portion of the casing.

The foregoing, and other objects which will appear as the nature of the invention is better understood, may be accomplished by a construction, combination and operative arrangement of parts, such as is disclosed by the drawings. The drawings, it is to be understood, are merely illustrative and disclose one embodiment of the improvement reduced to practice, as such departures therefrom may be made as fall within the scope of what I claim.

In the drawings:—

Figure 1 is an elevation of the improvement showing the same in a well casing.

Fig. 2 is a substantially central vertical longitudinal sectional view therethrough.

Fig. 3 is a fragmentary enlarged sectional view of the lower portion of the improvement showing the cutters projected, parts being in elevation.

Fig. 4 is a sectional view approximately on the line 4—4 of Fig. 1.

Fig. 5 is a fragmentary plan view of the head member of the improvement, showing the position of one of the gripping fingers in casing engaging position.

Fig. 6 is a sectional view approximately on the line 6—6 of Fig. 5.

Fig. 7 is a side elevation of the device illustrated in Fig. 5.

Referring now to the drawings in detail, the numeral 1 designates a tubular well casing that may be twisted or distorted and which is designed to be removed in sections by my improvement.

The improvement includes a coupler 2 to which the operating stem, not shown, is screwed or otherwise secured. The coupler has its lower end closed and preferably reduced and thickened and is centrally provided with a threaded opening for the reception of the upper threaded end of a stem 3. The stem is held against turning in the coupling by a binding element such as a screw or bolt 4 that enters a threaded opening in the reduced end of the said coupler and contacts with the stem 3.

Surrounding the upper portion of the stem and free mounted thereon is what I will term the head member 5 of the improvement. The head 5 is in the nature of a cylindrical block and has at its top a disk-like plate 6 that is provided with equi-distantly spaced angularly arranged slots 7. Through these slots pass gripping fingers 8 that are designed to engage with the casing 1 to hold the head against turning when the coupling and the stem are revolved. The fingers 8 each has its inner end provided with a spherical or otherwise weighted head that is received in a socket 10 in the head 5. The inner walls of the sockets have each a central depression in which is seated a spring 11 that exerts a tension against the head 9 to project the fingers through the angular slots and force the same against the casing 1. The fingers so projected will exert a sufficient frictional engagement with the casing to hold the head 5 against turning when the remainder of the structure is revolved around the casing. The fingers, when so projected will not, however, permit of the free outward movement of the improvement through the casing, and therefore I provide means for retracting the fingers. This means includes an angle arm 12 secured on one side of each of the heads 9. The straight member of each of the arms 12 passes through an angle slot in the disk 6, being projected a suitable distance outward of the said disk and the projecting end is engaged by an arched spring 13 that is secured, as at 14, on the disk or top 6 for the head 5. The spring exerts a pressure against the arm 12, and also underlies the finger. Incident to the weighted head on each of the fingers a downward movement violently exerted on the improvement will cause the heads of the fingers to drop into the pockets against the pressure of the light springs 11 and the flat springs 13 to be moved inwardly so that the fingers 8 will be held against the sides of the coupler 2.

On the under face of the head 5 there is secured or there may be formed a beveled gear 15. On the stem 3, directly below the beveled gear there is keyed a sleeve 16. The sleeve, at equi-distant points has outwardly extending radially disposed shafts 17, and on each of the shafts there is a pinion 18 that meshes with the beveled gear 15.

The body member of my improvement is in the nature of a tubular block and is indicated by the numeral 19. The body is of a diameter equaling that of the head, but is of a materially greater length than that of the said head. The body 19 is also free mounted on the stem 3, and has its upper end either integrally formed with or has secured thereon a beveled gear ring 20 with which the pinions 18 mesh.

The lower end of the body member 19 has a conical depression 21 therein which, of course, communicates with the central opening through which the stem 3 passes. The inner end of the depression may be straight, and the portion of the stem 3 received in the said end of the depression has an annular groove 22 therearound. Passing transversely through the body, and having their sides seated in suitable pockets therefor are headed bolts 23, the said bolts, of course, engaging in threaded openings in the said body. These bolts have conical or rounded ends 24 that are received in the annular groove 22 of the stem 3. The body, at points below the engagement of the screws carried thereby with the stem 3, is provided with any desired number of radially disposed pockets 25 which enter from the walls of the conical depression 21 and which communicate with reduced openings 26. The openings 26 receive therethrough the bit portions of cutters 27. The cutters have their inner ends headed as at 28, and the outer faces of the said heads are beveled or arranged at an angle, as at 29, the said angle corresponding to that of the wall of the conical depression 21. The heads are preferably square or rectangular in plan to correspond to the shape of the pockets 25, and between the inner walls of the said pockets and the inner faces of the said heads there are arranged on the shanks of the cutters springs 30 designed to normally force the cutters inward of the body and the heads thereof into the depression 21.

The portion of the shank 3 projecting beyond the grooved part thereof which is engaged by the bolts carried by the body may be reduced, and is threaded, as at 31. On the lower end of the shank there is a frusto-conical weighted guide 32. This guide, while threaded on the shank is also secured thereto by a binding element, such as a bolt or screw 38. Above the guide, and having its threaded bore engaged by the threads 31 of the stem 3 is a conical bit projecting element 34. The element 34 has one of its sides slotted, as at 35, and in this slot is received a guide which, in the showing of the drawings, is one end of a bolt or screw 36 which is threaded through the body and enters the lower portion of the conical depression 21.

The cutter is lowered to a desired depth in the casing 1 and the head thereof is held against turning by the engagement of the fingers 8 with the said casing, as previously described. The stem 3 is revolved by means connected with the coupling 2, in the usual manner. The turning of the stem causes the sleeve 16 to revolve, which carrying the pinions 18 which engage with the gear ring 20 of the body also revolves the body. The turning of the stem 3, in one direction will cause the follower or bit projecting element 34 to ride upwardly on the threaded portion 31 of the stem 3 into the conical depression 21 of the body 19 which, contacting with the beveled heads of the shanks of the cutters will project the cutters to bring the same into engagement with the casing to cut the same. It will be noted that the element 36 engaging in the groove 35 of the member 34 holds the said member against turning. When a section of the casing has been severed the coupling 2 is turned in a reverse direction, which causes the stem 3 to be likewise reversely turned so that the follower member 34 will be moved outward of the conical depression 31 in the body 19. The spring between the pockets and the heads of the cutters will bring the said cutters inward of the body. The fingers are brought to non-casing engaging position in a manner as previously described, and thus the tool as a whole may be removed from the casing. After the tool is removed the cut section of the casing may be likewise readily removed. The tool may be again inserted in the casing and an additional portion thereof may be severed and removed. This operation is repeated until all of the undesired portions of the casing are severed and removed.

It is noted that the planetary gears impart a rapid rotary motion to the body which carries the cutters, so that the tubular casing will be quickly cut.

It is thought that the foregoing description, when taken in connection with the drawings will clearly set forth the simplicity of the construction thereof, the advantages thereof, as well as the operation to those skilled in the art to which such inventions relate without further detail description.

Having thus described the invention, what I claim, is:—

1. In a cutting device for well casings, a body carrying laterally disposed cutters, and a head, means carried by the latter for engaging with the casing to hold the head against turning, latching means for said holding means, releasing means for said holding means, means for revolving the body, means for advancing the cutters to their work with the turning of the body, and means for normally holding the cutters against such advancement.

2. In a cutting device for well casings, a body carrying spring influenced angularly arranged cutters, and a head, spring influenced weighted fingers on the latter for engaging with the casing to hold the head against turning, latching means therefor, releasing means therefor, means for revolving the body, and means for advancing the cutters to their work, with the turning of the body.

3. In a cutting device for well casings, a body carrying angularly arranged laterally disposed cutters, a head, means carried by the latter for engaging with the casing to hold the head against turning in the casing, releasing means for said holding means, means for revolving the head at a greater ratio of speed than that of the revolving means, and means operated by the last mentioned means for advancing the cutters to their work.

4. In a cutting device for well casings or the like, a head, and a body, laterally disposed spring influenced cutters carried by the latter, means carried by the head for engaging with the casing to hold the said head from turning in the casing, latching means for said holding means, releasing means for said latching means, a stem passing through the head and body, means carried by the stem coengaging with the head and with the body for rapidly revolving the latter when the stem is turned, means permitting the turning of the body on the stem, and means carried by the stem for advancing the cutters to their work.

5. In a cutting device for tubular well casings or the like, a head, a stem passing therethrough, a body receiving the stem therethrough, laterally arranged spring influenced cutters carried by the body, means for permitting the free turning of the body on the stem, means carried by the head for engaging with the casing for holding the head against turning in the casing, releasing means for said holding means, means for revolving the stem, means between the stem, head and body for revolving the latter at a greater ratio of speed than that of the stem, and a follower movable longitudinally on the stem and in contacting engagement with the heads of the cutters for advancing the latter to their work when the stem is turned in one direction, and for permitting the springs to influence the said cutters to retract the same, when the stem is turned in a second direction.

6. In a cutting device for well casings or the like, a stem having a threaded portion, a guide on the outer end thereof, a coupling on the opposite end, means for revolving the coupling and stem, a head free mounted on the stem, spring influenced weighted fingers received in sockets in the head and passing therethrough and designed to be influenced by said springs to engage with the well casing to hold the head against turning therewith, means for latching the fingers in such position, means for releasing the latches to cause the fingers to be brought out of engagement with the casing and to be so held, a gear ring on the under face of the head, a sleeve keyed to the stem and carrying pinions which mesh with the gear ring, a body arranged for free turning on the stem, a gear ring carried thereby engaged by the pinions, laterally disposed cutters passing through the body, spring means for normally retaining the cutters inward of the body, a conical follower threaded on the stem for engaging with the heads of the cutters, and means for holding the follower against turning with the stem, as and for the purpose set forth.

In testimony whereof I affix my signature.

GEORGE W. MILLER.